United States Patent
Oughton, Jr. et al.

(10) Patent No.: US 7,583,109 B2
(45) Date of Patent: Sep. 1, 2009

(54) APPARATUS AND METHODS FOR MONITORING PARALLEL-CONNECTED POWER SWITCHING DEVICES RESPONSIVE TO DRIVE CIRCUIT PARAMETERS

(75) Inventors: George W. Oughton, Jr., Raleigh, NC (US); George Arthur Navarro, Raleigh, NC (US)

(73) Assignee: Eaton Corporation, Cleveland, OH (US)

( * ) Notice: Subject to any disclaimer, the term of this patent is extended or adjusted under 35 U.S.C. 154(b) by 529 days.

(21) Appl. No.: 11/226,118

(22) Filed: Sep. 14, 2005

(65) Prior Publication Data

US 2007/0058403 A1    Mar. 15, 2007

(51) Int. Cl.
*H03B 1/00*    (2006.01)
*H02M 7/217*    (2006.01)

(52) U.S. Cl. .................................. 327/108; 363/127

(58) Field of Classification Search ......... 327/108–110, 327/112, 434; 363/127, 132, 79, 95; 323/282, 323/285
See application file for complete search history.

(56) References Cited

U.S. PATENT DOCUMENTS

| | | | |
|---|---|---|---|
| 5,949,273 A | 9/1999 | Mourick et al. | |
| 6,518,821 B2 | 2/2003 | Joerg | |
| 6,741,116 B2 | 5/2004 | Herzer et al. | |
| 6,851,077 B2 | 2/2005 | Herzer et al. | |
| 2003/0093713 A1* | 5/2003 | Werner et al. | .................. 714/25 |

OTHER PUBLICATIONS

Lehmann et al., Method for Elect Detect. Of End-of-Life Failures in power Semiconductors, Semikron Elektronik, 2003.*
Munzer et al., EconoPack+, A new IGBT module for optimized Inverter Solution, eupec GmbH &Co.KG, Aug. 2000.*
Lehmann et al., "Method for Electrical Detection of Bond Wire Lift-Off for power Semiconductors," Semikron Elektronik GmbH, www.semikron.com; 2003, 10 pages.

* cited by examiner

*Primary Examiner*—Akm E Ullah
*Assistant Examiner*—Jue Zhang
(74) *Attorney, Agent, or Firm*—Myers Bigel Sibley & Sajovec, P.A.

(57) ABSTRACT

An apparatus, such as an inverter or rectifier in a double-conversion UPS, includes a plurality of power switching devices, such as IGBTs, coupled in parallel. A drive circuit is coupled to the power switching devices at a plurality of drive nodes and configured to drive the drive nodes responsive to a drive control signal. A monitoring circuit is coupled to the drive circuit and configured to determine respective statuses of respective ones of the power switching devices. The monitoring circuit may be configured to generate respective measures of drive delivered to respective ones of the drive nodes.

21 Claims, 7 Drawing Sheets

APPARATUS AND METHODS FOR MONITORING PARALLEL-CONNECTED POWER SWITCHING DEVICES RESPONSIVE TO DRIVE CIRCUIT PARAMETERS

BACKGROUND OF THE INVENTION

The present invention relates to power electronics apparatus and methods and, more particularly, to apparatus and methods for monitoring parallel-connected power switching devices.

Power conversion apparatus, such as uninterruptible power supply (UPS) apparatus, often employ power switching devices to perform power conversion operations, such as rectification or inversion. For example, a typical double conversion UPS may include an inverter and/or a rectifier including power transistors, such as insulated gate bipolar transistors (IGBTs), arranged in a half-bridge C configuration. Such an IGBT may be driven by driver/monitor circuits that include circuitry for driving a gate or base terminal of the power transistor, along with circuitry for monitoring collector-emitter voltage for short circuit detection, as described in U.S. Pat. No. 6,741,116 to Herzer et al. and U.S. Pat. No. 6,851,077 to Herzer et al. An article by Lehmann et al. entitled "Method for Electrical Detection of End-of-Life Failures in Power Semiconductors," published in 2003 by Semikron Elektronik GmbH at www.semikron.com describes techniques for detecting emitter and gate bond wire liftoff in IGBTs that makes use of gate driver circuitry.

In high-capacity applications, multiple power switching devices, e.g., IGBTs, may be connected in parallel to provide increased current capacity, as shown, for example, in U.S. Pat. No. 6,518,821 to Jeorg and U.S. Pat. No. 5,949,273 to Mourick et al. In particular, large-scale UPSs may utilize rectifier or inverter modules with converter circuits that contain IGBT modules having multiple IGBTs that are configured to allow connection in parallel configurations. Examples of such a multi-IGBT modules are the SixPACK IGBT modules distributed by eupec, Inc. and described at www.eupec.com. These SixPACK modules include six IGBTs that are configured to allow connection in a half-bridge arrangement of two groups of three parallel-connected IGBTs. Multiple ones of such IGBT modules may be further connected in parallel to construct, for example, a high-capacity rectifier or inverter module. Such rectifier and inverter modules may be further paralleled to provide even greater capacity.

SUMMARY OF THE INVENTION

In some embodiments of the present invention, an apparatus includes a plurality of power switching devices, such as IGBTs, coupled in parallel, as in rectifier and/or inverter applications. A drive circuit is coupled to the power switching devices at a plurality of drive nodes and configured to drive the drive nodes responsive to a drive control signal. A monitoring circuit is coupled to the drive circuit and configured to determine respective statuses of respective ones of the power switching devices. The monitoring circuit may be configured to generate respective measures of drive delivered to respective ones of the drive nodes and to determine the respective statuses of the power switching devices from the measures of drive.

In some embodiments, the drive circuit may include an input circuit configured to receive the drive control signal. The drive circuit may further include a plurality of output circuits, respective ones of which are configured to drive respective ones of the drive nodes responsive to the input circuit and are each galvanically isolated from the input circuit. The monitoring circuit may be galvanically coupled to the input circuit.

In additional embodiments of the present invention, the drive circuit may include respective transformers having respective secondary windings coupled to respective ones of the gate drive nodes, and a primary driver circuit configured to drive primary windings of the transformers. The monitoring circuit may include respective current sensors configured to sense respective currents in the respective primary windings. The respective primary windings may be coupled to a common power supply by respective current paths that are monitored by respective ones of the current sensors, and the primary driver may be configured to constrain current flow from the common power supply to each primary winding to the current path associated with the winding. The current sensors may be configured to generate respective current sense signals indicative of respective currents in the respective current paths, and the monitoring circuit may further include means for averaging the current sense signals to generate average signals indicative of drive delivered to the respective drive nodes.

In further embodiments, current sensors may include respective current sense resistors coupled in series with the respective primary windings. Center taps of the respective primary windings may be coupled to a common power supply by respective ones of the current sense resistors, and the primary driver circuit may include a switching circuit coupled to first and second end taps of the primary windings and operative to sink currents therefrom responsive to the drive control signal. The primary driver circuit may further include steering diodes coupled in series with each of the first and second end taps of the primary windings. The monitoring circuit may further include a filter circuit configured to filter respective voltages across the respective current sense resistors to generate filtered voltages indicative of drive delivered to the respective drive nodes.

According to additional embodiments of the present invention, an apparatus, e.g., a power driving stage of a rectifier or inverter module, includes a half-bridge circuit including first and second banks of parallel-connected power switching devices coupled at a common node, each of the first and second banks including one or more groups of power switching devices. The apparatus also includes a drive circuit configured to apply respective drive signals to respective drive nodes of respective ones of the groups of power switching devices responsive to respective drive control signals. The apparatus further includes a monitoring circuit configured to monitor respective statuses of respective ones of the power switching devices responsive to the drive circuit.

The drive circuit may include an input circuit configured to receive the drive control signal, and a plurality of output circuits, respective ones of which are configured to drive respective ones of the drive nodes responsive to the input circuit and which are each galvanically isolated from the input circuit, wherein the monitoring circuit is galvanically coupled to the input circuit. The drive circuit may include respective transformers having respective secondary windings coupled to respective ones of the gate drive nodes and a primary driver circuit configured to drive primary windings of the transformers. The monitoring circuit may include respective current sensors configured to sense respective currents in the respective primary windings. The monitoring circuit may be configured to detect a presence and/or an absence of a Miller effect at the respective drive nodes.

In some method embodiments of the present invention, paralleled power switching devices driven by a drive circuit are monitored. In particular, respective status of respective ones of the power switching devices may be determined responsive to the drive circuit. For example, determining respective statuses of respective ones of the power switching devices responsive to the drive circuit may include generating respective measures of drive delivered to respective ones of the drive nodes. The drive circuit may include respective transformers having respective secondary windings coupled to the respective drive nodes and a primary driver circuit configured to drive primary windings of the transformers, and generating respective measures of drive delivered to respective ones of the drive nodes may include sensing respective currents in the respective primary windings.

DETAILED DESCRIPTION OF EXEMPLARY EMBODIMENTS

Figure 1:
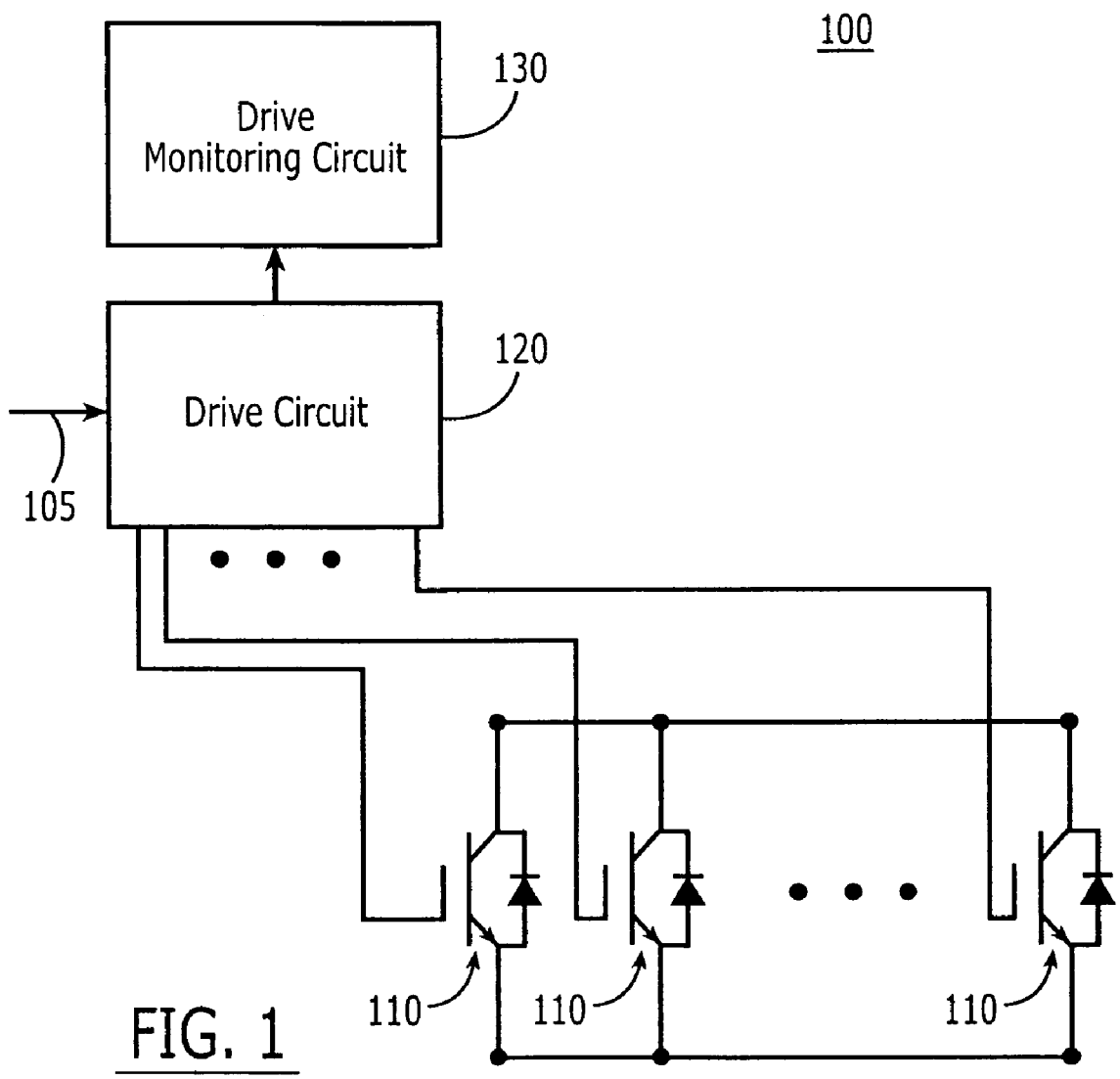
FIG. 1 illustrates an apparatus according to some embodiments of the present invention.

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular exemplary embodiments illustrated in the accompanying drawings is not intended to be limiting of the invention. In the drawings, like numbers refer to like elements.

As used herein, the singular forms "a", "an" and "the" are intended to include the plural forms as well, unless expressly stated otherwise. It will be further understood that the terms "includes," "including" and/or "including," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments of the present invention described herein relate to parallel-connected power switching devices, more particularly, parallel-connected insulated gate bipolar transistors (IGBTs) used in power conversion circuits, such as rectifier and inverters used in uninterruptible power supplies (UPSs). It will be understood, however, that embodiments of the present invention may be used with other types of power switching devices and/or in other types of power electronics applications. For example, the present invention is applicable to parallel-connected field effect transistors (FETs), bipolar junction transistors (BJTs), or other power switching devices that include a current path that is controlled by "driving" a control (or drive) electrode, e.g., a gate or base electrode. The present invention is also applicable to a wide variety of power electronics applications, including, but not limited to, rectifiers, inverters, amplifiers, and motor controllers.

Some embodiments of the present invention arise from a realization that, in applications that utilize parallel-connected power switching devices, it may be desirable to monitor respective statuses of the power switching devices for control and/or service purposes. For example, in some applications, it may be desirable to detect failure of a particular parallel-connected device in a power electronics circuit in order to determine, for example, whether to continue operation of the circuit, for example, whether to continue to supply power to a load using the circuit or to shut down the circuit and transfer the load to another supply path. Such information may also be useful for maintenance, for example, to determine the sequence of events that led to a particular failure and/or to identify which particular switching device has failed for purposes of replacement.

FIG. 1 illustrates a power conversion apparatus 100 according to some embodiments of the present invention. As shown, the apparatus includes a plurality of parallel-connected power switching devices, here shown as a plurality of parallel-connected IGBTs 110. Gates of the IGBTs 100 are driven by a drive circuit 120 responsive to a drive control signal 105. A drive monitoring circuit 130 is coupled to the drive circuit 120 and configured to determine respective statuses of respective ones of the IGBTs 110 responsive to the drive circuit 120. It will be appreciated that although FIG. 1 illustrates a plurality of IGBTs 110, the present invention may be used with other power switching devices, such as BJTs and FETs.

Figure 2:
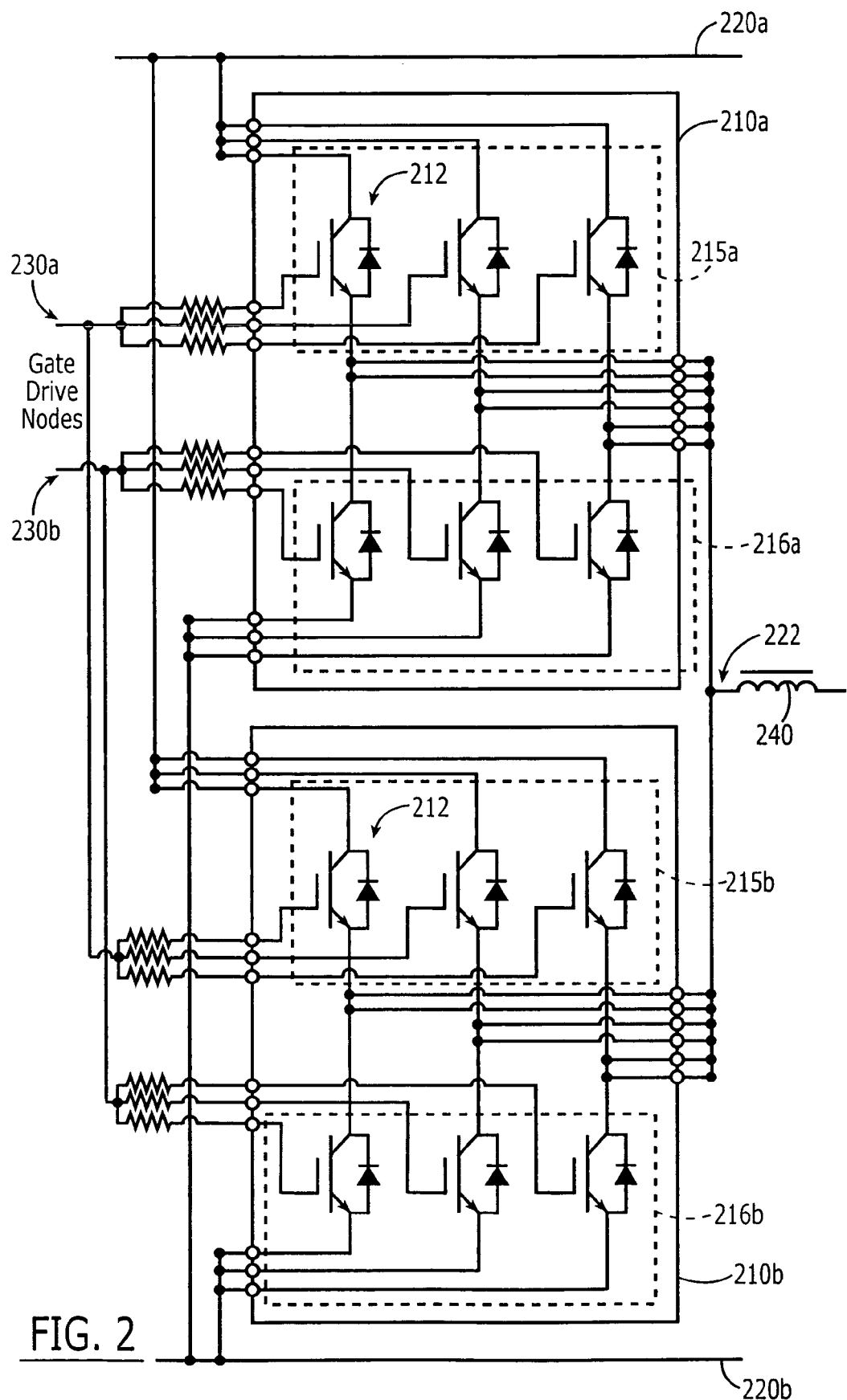
FIG. 2 illustrates an IGBT configuration that may be used with some embodiments of the present invention.
Figure 3:
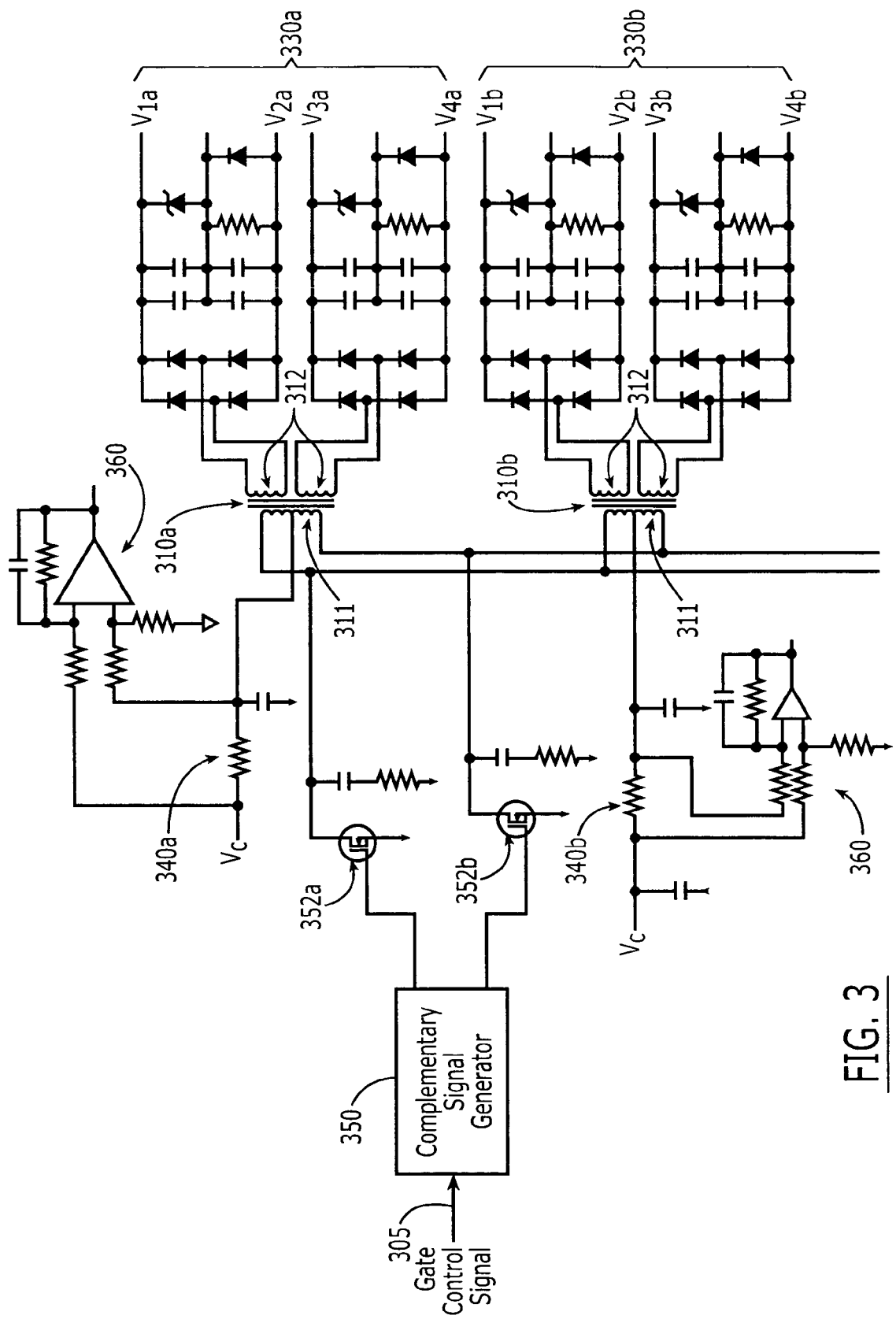
FIGS. 3 and 4 illustrate a gate drive circuit and gate drive monitoring circuit according to further embodiments of the present invention.
Figure 4:
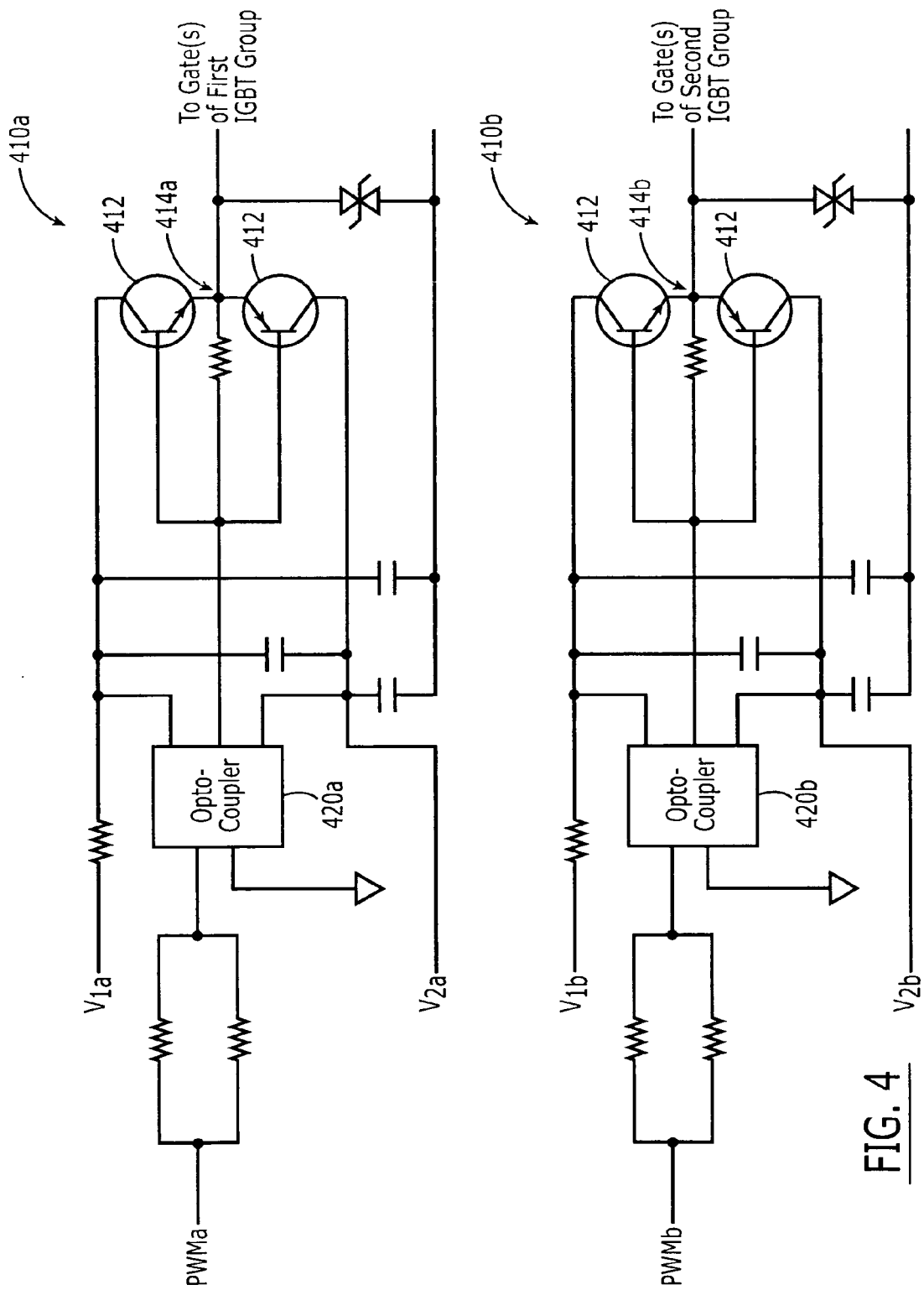

FIGS. 2-4 illustrate a parallel-connected array of IGBTs, drive circuit and drive monitoring circuit according to further embodiments of the present invention and, more particularly, IGBTs and drive and monitoring circuitry that may be integrated in a power conversion module that may be configured for rectifier and/or inverter functionality. Referring to FIG. 2, IGBTs 212 in first and second six-device IGBT modules 210a, 210b are arranged to provide a half-bridge circuit. A first group 215a of IGBTs 212 in the first module 210a are coupled in parallel between a first bus 220a, e.g., a positive DC voltage bus, and an output node 222. A first group 215b of IGBTs 212 in the second module 210b are coupled in parallel between the first bus 220a and the output node 222, in parallel with the first group 215a of IGBTs 212 of the first module 210a. A second group 216a of IGBTs 212 in the first module 210a are coupled in parallel between a second bus 220b, e.g., a negative DC voltage bus, and the output node 222. A second group 216*b* of IGBTs 212 in the second module 210*b* are coupled in parallel between the second bus 220*b* and the output node 222, in parallel with the second group 216*a* of IGBTs 212 of the first module 210*a*. Gate terminals of the IGBTs 212 of the "upper" groups 215*a*, 215*b* are coupled to a first drive node 230*a*, while gate terminals of the IGBTs of the "lower" groups 216*a*, 216*b* are coupled to a second drive node 230*b*. The output node 222 is coupled to an inductor 240.

FIGS. 3 and 4 illustrate gate drive circuitry that may be used to drive the gate nodes 230*a*, 230*b* of FIG. 2. Referring to FIG. 3 a gate control signal 305, e.g., a square wave signal, is provided to a complementary drive signal generator 350. The complementary drive signal generator 350 produces complementary drive signals that control respective FETs 352*a*, 352*b* that control current paths through end taps of parallel-connected primary windings 311 of a plurality of transformers 310*a*, 310*b*. Respective center taps of the respective primary windings 311 are coupled to a power supply $V_c$ via respective current sense resistors 340*a*, 340*b*. Secondary windings 312 of the respective transformers 310*a*, 310*b* are coupled to respective rectifier circuits 330*a*, 330*b*, which produce voltages $V_{1a}$, $V_{2a}$, $V_{3a}$, $V_{4a}$, $V_{1b}$, $V_{2b}$, $V_{3b}$, $V_{4b}$.

Referring to FIG. 4, the voltages $V_{1a}$, $V_{2a}$, $V_{1b}$, $V_{2b}$, are provided to gate drivers 410*a*, 410*b*. The gate drivers 410*a*, 410*b* include totem-pole connected pairs of bipolar transistors 412 which have output nodes 414*a*, 414*b* that are connected to gate drive nodes, e.g., the respective gate drive nodes 230*a*, 230*b* shown in FIG. 2. The voltages produced at the output nodes 414*a*, 414*b* are further modulated by optocouplers 420*a*, 420*b* responsive to pulse width modulation signals PWMa, PWMb.

Referring again to FIG. 3, a gate drive monitoring circuit that determines status of IGBTs driven by the circuitry shown in FIGS. 3 and 4 includes the current sense resistors 340*a*, 340*b*, which develop voltages indicative of the currents passing through the primary windings 311 of the drive transformers 310*a*, 310*b*. The currents passing through the sense resistors 340*a*, 340*b* may correlate with the state of the respective IGBTs being driven. In particular, for the IGBT configuration shown in FIG. 2, a typical failure mode for the IGBT modules 210*a*, 210*b* is for an IGBT in one of the upper or lower groups in a half-bridge to fail in an open state, perhaps after a brief period of short-circuited operation. When one of the IGBTs fails as such, the capacitance at its gate terminal typically changes due to the elimination of a Miller capacitance arising from the complementary nature of the half-bridge operation. This change in gate capacitance leads to change in the drive (e.g., current) delivered to the gate drive node, which is reflected back through the gate drive circuitry shown in FIGS. 3 and 4, resulting in a change in the current passing through the primary winding 311 to which the failed device is coupled. Another potential failure mode is for the gate of and IGBT to fail shorted, which can cause a significant increase in drive current.

A change in primary current may be sensed as a change in voltage across the sense resistor 340*a*, 340*b*. As shown in FIG. 3, this voltage may be filtered (averaged) by a filter circuit 360, which produces a filtered voltage that is indicative of the drive being delivered to the gate drive node associated with the failed device. This information may be used to decide, for example, whether or not it is advisable to shut down the power conversion apparatus to prevent further damage due to overload, or to allow the converter to continue operation with diminished current carrying capacity. Such information may also be logged or recorded, such that, for example, maintenance personal may more easily and quickly identify a failed device for purposes of repair and/or defect analysis may be conducted. The gate drive monitoring circuitry can provide detection of the status of the driven IGBT from the front end of the gate drive circuitry, using the galvanic isolation afforded by the transformers 311.

Figure 5:
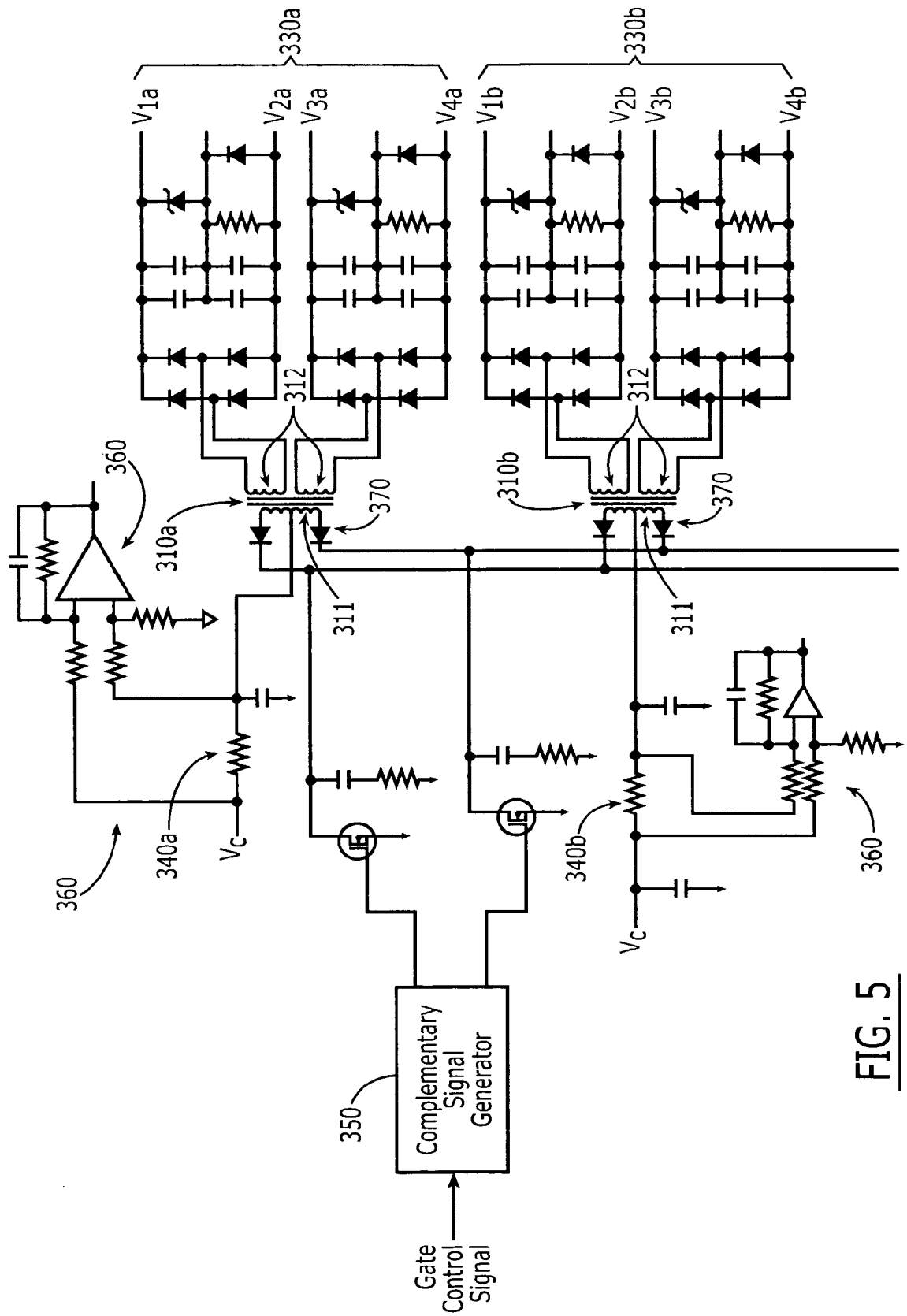
FIG. 5 illustrates a gate drive circuit and gate drive monitoring circuit according to additional embodiments of the present invention.

FIG. 5 illustrates a slightly modified drive and monitoring circuit configuration that may provide additional discrimination in detecting failed power devices. In particular, the drive and monitoring circuitry shown in FIG. 5 is substantially identical to that shown in FIG. 3, with like components being indicated by like reference designations. The drive and monitoring circuitry shown in FIG. 5 differs in the provision of steering diodes 370 in the current paths of the primary windings 311 of the drive transformers 310*a*, 310*b*. The steering diodes 370 can prevent current from flowing from a single one of the current sense resistors 340*a*, 340*b* to multiple ones of the primary windings 311, such that failure of an IGBT coupled to a particular transformer may be more readily ascertained.

Figure 6:
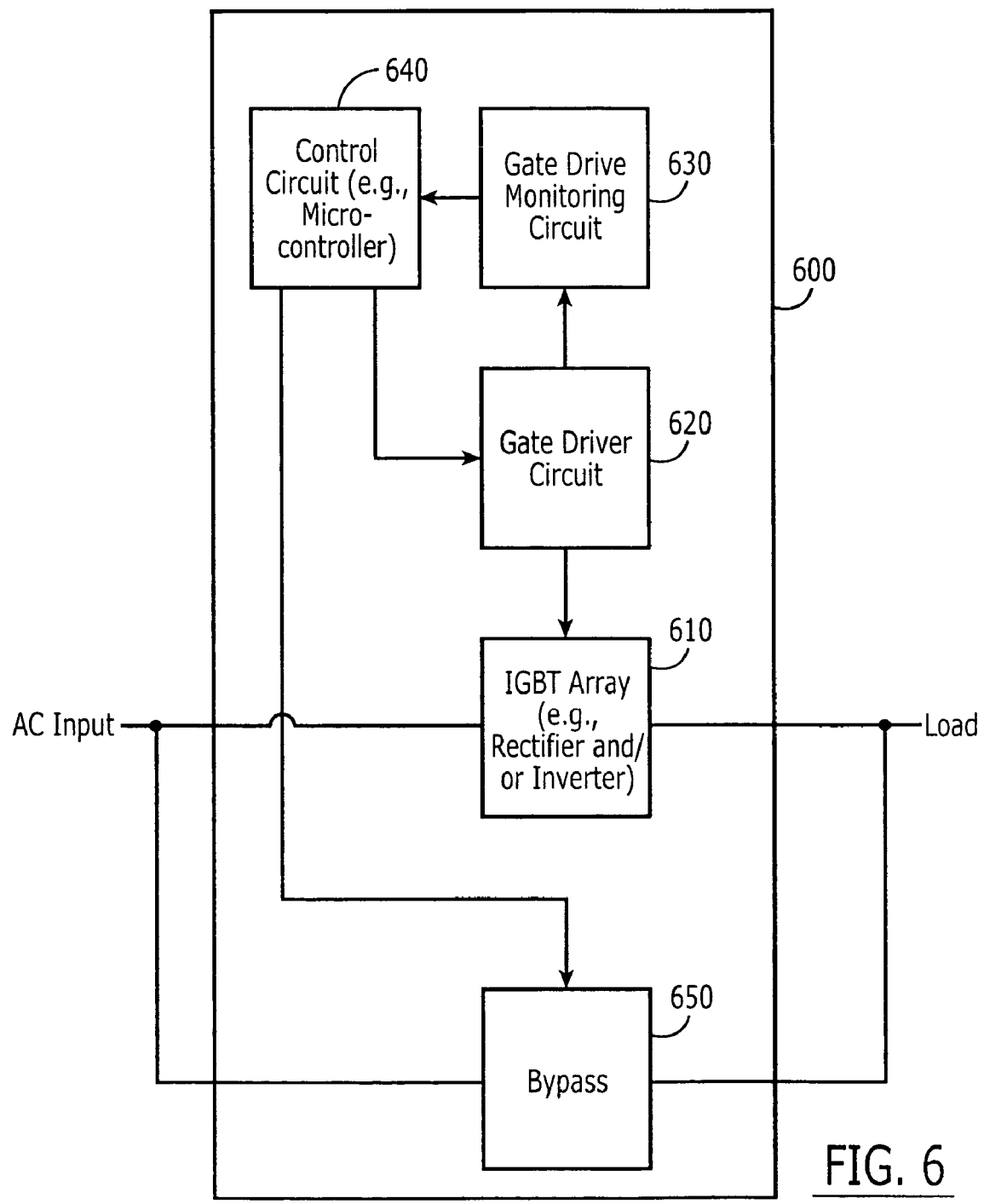
FIG. 6 illustrates a UPS with a gate drive monitoring capability according to further embodiments of the present invention.

FIG. 6 illustrates exemplary application of gate monitoring in a UPS 600 according to further embodiments of the present invention. The UPS 600 includes an array 610 of IGBTs, such as the IGBT array shown in FIG. 2, which may be used, for example, to provide rectifier and/or inverter functions. The IGBT array 610 is driven by a gate drive circuit 620, having a gate drive monitoring circuit 630 coupled thereto. The gate drive circuit 620 and the gate drive monitoring circuit 630 may be configured as shown, for example, in FIGS. 3 and 4. The UPS 600 further includes a bypass circuit 650, which may be used to directly couple an AC input to a load, thus bypassing the IGBT array 610.

As shown, the UPS 600 further includes a control circuit 640, which receives status information relating to the IGBTs of the IGBT array 610 from the gate drive monitoring circuit 620. This status information may include, for example, a filtered voltage representative of gate drive being delivered by the gate drive circuit 620, along the lines described above with reference to FIGS. 2-4. In response to the status information, the control circuit 640, e.g., a microcontroller or other computing circuitry, may control operations of the gate drive circuit 620 and/or the bypass circuit 650. It will be appreciated that the IGBT array 610, the gate drive circuit 620, the monitoring circuit 630 and the control circuit 640 may be implemented in a number of different ways. For example, the IGBT array 610 may be integrated with the gate drive circuit 620 and the gate drive monitoring circuit 630 in a rectifier or inverter module, which may be further paralleled with like modules. Portions of the control circuit 640 may also be included in such a module.

Figure 7:
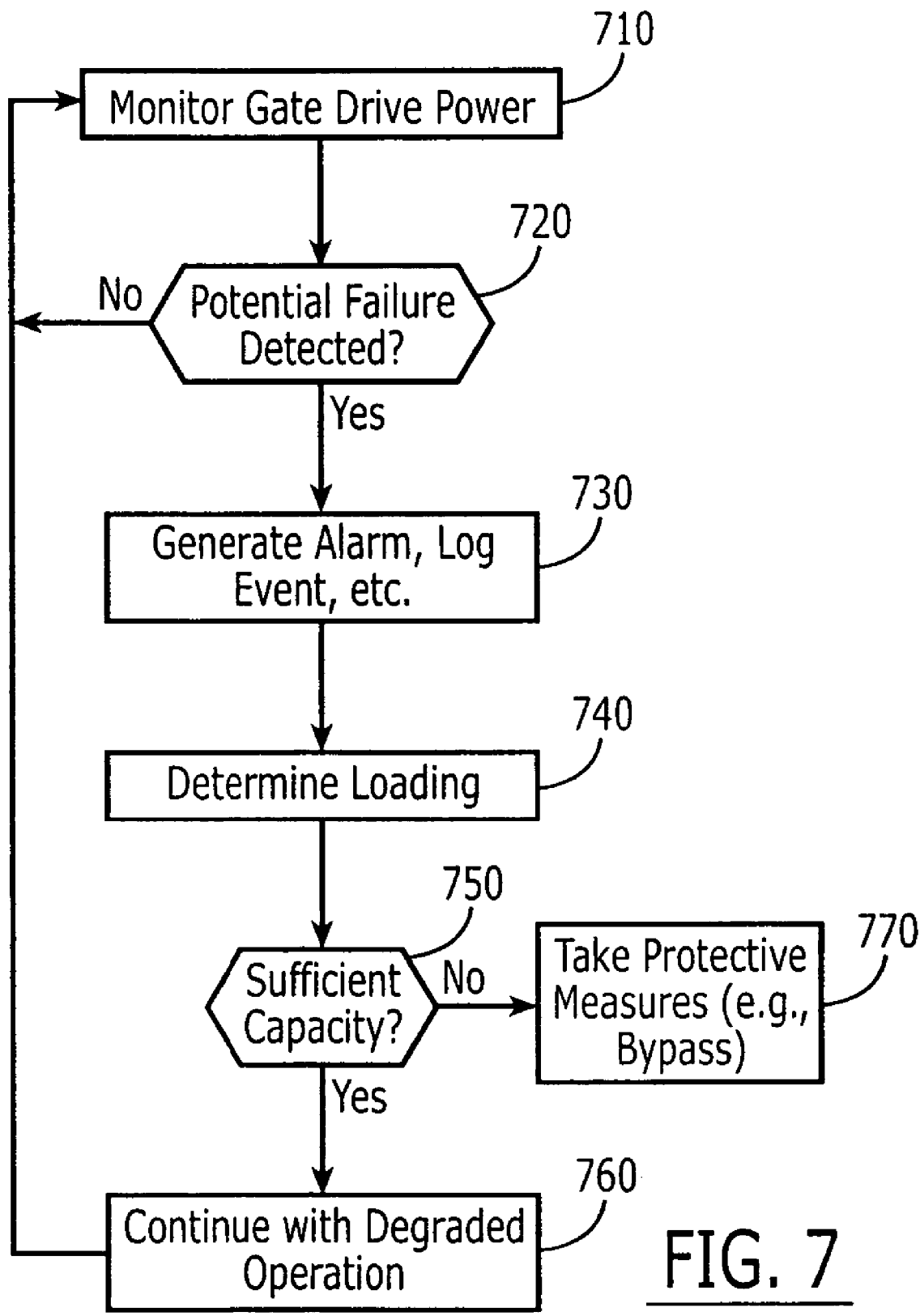
FIG. 7 illustrates exemplary operations of the UPS of FIG. 6 according to some embodiments of the present invention.

FIG. 7 illustrates exemplary operations that may be performed by the UPS 600. The gate drive monitoring circuit 630 and the control circuit 640 monitor gate drive being delivered to the IGBTS of the IGBT array 610 (block 710). In response to detection of a potential failure of a device (block 720), the control circuit 640 may cause particular actions to occur, such as the generation of an alarm or other indication and/or the logging of a failure event for reference in subsequent maintenance operations. Additionally, the control circuit 640 may automatically undertake actions to control operations of the IGBT array 610 and/or other components of the UPS 600. For example, the control circuit 730 may determine a current loading of the IGBT array 610 (block 740). If the control circuit 640 determines that sufficient capacity still exists to serve the load (block 750), the control circuit 640 may allow continued operation of the IGBT in a degraded condition (block 760). If sufficient capacity is not present however, the control circuit 640 may take protective actions. For example, the control circuit 640 may disable the gate drive circuit 620 such that the IGBT array 610 is put into a high impedance state, and concurrently cause the bypass circuit 650 to provide power to the load.

The flowcharts, flow diagrams and block diagrams of FIGS. 1-7 illustrate architecture, functionality, and operations of possible implementations of apparatus and methods according to various embodiments of the present invention. It should be noted that, in some embodiments of the present invention, components may be arranged differently than shown in the figures and/or acts may occur in an order different than that shown in the figures. For example, two blocks shown in succession may, in fact, be executed substantially concurrently, or the blocks may sometimes be executed in the reverse order, depending upon the functionality involved.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed is:

1. An apparatus comprising:
    a plurality of power switching devices coupled in parallel and operative to conduct current responsive to drive signals applied to a plurality of drive nodes;
    a drive circuit coupled to the power switching devices at the plurality of drive nodes and configured to generate the drive signals responsive to a drive control signal, wherein the drive circuit comprises:
        an input circuit configured to receive the drive control signal; and
        a plurality of output circuits, respective ones of which are configured to drive respective ones of the drive nodes responsive to the input circuit and which are each galvanically isolated from the input circuit; and
    a monitoring circuit coupled to the drive circuit and configured to determine respective measures of drive delivered to respective ones of the drive nodes and to determine respective statuses of respective ones of the power switching devices responsive to the respective measures of drive, wherein the monitoring circuit is galvanically coupled to the input circuit.

2. An apparatus according to claim 1:
    wherein the drive circuit comprises respective transformers having respective secondary windings coupled to respective ones of the gate drive nodes and a primary driver circuit configured to drive primary windings of the transformers; and
    wherein the monitoring circuit comprises respective current sensors configured to sense respective currents in the respective primary windings.

3. An apparatus according to claim 2, wherein the respective primary windings are coupled to a common power supply by respective current paths that are monitored by respective ones of the current sensors, and wherein the primary driver is configured to constrain current flow from the common power supply to each primary winding to the current path associated with the winding.

4. An apparatus according to claim 2, wherein the current sensors comprise respective current sense resistors coupled in series with the respective primary windings.

5. An apparatus according to claim 4, wherein center taps of the respective primary windings are coupled to a common power supply by respective ones of the current sense resistors, and wherein the primary driver circuit comprises a switching circuit coupled to first and second end taps of the primary windings and operative to sink currents therefrom responsive to the drive control signal.

6. An apparatus according to claim 5, wherein the primary driver circuit further comprises steering diodes coupled in series with each of the first and second end taps of the primary windings.

7. An apparatus according to claim 4, wherein the monitoring circuit further comprises a filter circuit configured to filter respective voltages across the respective current sense resistors to generate filtered voltages indicative of drive delivered to the respective drive nodes.

8. An apparatus according to claim 2, wherein the current sensors are configured to generate respective current sense signals indicative of respective currents in the respective current paths, and wherein the monitoring circuit further comprises means for averaging the current sense signals to generate average signals indicative of drive delivered to the respective drive nodes.

9. An apparatus according to claim 1, further comprising a control circuit coupled to the monitoring circuit and to the drive circuit and configured to control operation of the power switching devices responsive to the determined status of the power switching devices.

10. An apparatus according to claim 1, wherein the plurality of power switching devices comprises a plurality of insulated gate bipolar transistors (IGBTs).

11. An uninterruptible power supply including the apparatus of claim 1.

12. A rectifier or inverter module including the apparatus of claim 1.

13. An apparatus comprising:
    a half-bridge circuit comprising first and second banks of parallel-connected power switching devices coupled at a common node, each of the first and second banks including one or more groups of power switching devices;
    a drive circuit configured to apply respective drive signals to respective drive nodes of respective ones of the groups of power switching devices responsive to respective drive control signals; and
    a monitoring circuit configured to monitor respective statuses of respective ones of the power switching devices responsive to the drive circuit.

14. An apparatus according to claim 13, wherein the monitoring circuit is configured to generate respective measures of drive delivered to respective ones of the drive nodes.

15. An apparatus according to claim 14:
    wherein the drive circuit comprises:
        an input circuit configured to receive the drive control signal; and
        a plurality of output circuits, respective ones of which are configured to drive respective ones of the drive nodes responsive to the input circuit and which are each galvanically isolated from the input circuit; and
    wherein the monitoring circuit is galvanically coupled to the input circuit.

16. An apparatus according to claim 14:
    wherein the drive circuit comprises respective transformers having respective secondary windings coupled to respective ones of the gate drive nodes and a primary driver circuit configured to drive primary windings of the transformers; and wherein the monitoring circuit comprises respective current sensors configured to sense respective currents in the respective primary windings.

17. An apparatus according to claim 14, wherein the monitoring circuit is configured to detect a presence and/or an absence of a Miller effect at the respective drive nodes.

18. An apparatus according to claim 14, wherein the power switching devices comprise a plurality of transistors packaged in a plurality of multi-transistor modules, wherein respective ones of the groups of power devices comprises respective groups of the transistors, and wherein the transistors are arranged such that groups of transistors of a given one of the first and second banks are in different ones of the modules.

19. An uninterruptible power supply including an apparatus according to claim 13.

20. A rectifier or inverter module including an apparatus according to claim 13.

21. A method of monitoring paralleled power switching devices driven by a drive circuit at a plurality of drive nodes, the method comprising:
   generating respective measures of drive delivered to respective ones of the drive nodes; and
   determining respective status of respective ones of the power switching devices responsive to the respective measures of drive; and
   wherein the drive circuit comprises respective transformers having respective secondary windings coupled to the respective drive nodes and a primary driver circuit configured to drive primary windings of the transformers, and wherein generating respective measures of drive delivered to respective ones of the drive nodes comprises sensing respective currents in the respective primary windings.

* * * * *